US010979602B2

(12) United States Patent
Tsuji

(10) Patent No.: US 10,979,602 B2
(45) Date of Patent: Apr. 13, 2021

(54) IMAGE FORMING CONTROL DEVICE THAT SELECTS IMAGE FORMING MEDIUM FOR REPRODUCING IMAGE COLOR INDICATED BY INPUTTED IMAGE DATA, IMAGE FORMING APPARATUS, IMAGE FORMING CONTROL METHOD, AND NON-TRANSITORY COMPUTER-READABLE RECORDING MEDIUM HAVING IMAGE FORMING CONTROL PROGRAM

(71) Applicant: KYOCERA Document Solutions Inc., Osaka (JP)

(72) Inventor: Yuka Tsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/818,444

(22) Filed: Mar. 13, 2020

(65) Prior Publication Data

US 2020/0304688 A1 Sep. 24, 2020

(30) Foreign Application Priority Data

Mar. 20, 2019 (JP) ............................ JP2019-053114

(51) Int. Cl.
*H04N 1/60* (2006.01)
*H04N 1/00* (2006.01)

(52) U.S. Cl.
CPC ....... *H04N 1/6097* (2013.01); *H04N 1/00005* (2013.01); *H04N 1/0044* (2013.01); *H04N 1/6002* (2013.01)

(58) Field of Classification Search
CPC ............ H04N 1/6097; H04N 1/00724; H04N 1/00806; H04N 1/2323; H04N 1/6002
(Continued)

(56) References Cited

U.S. PATENT DOCUMENTS

2002/0165833 A1* 11/2002 Minowa ............ H04N 1/00002 705/400
2008/0180704 A1 7/2008 Kametani
2011/0170142 A1 7/2011 Ito et al.

FOREIGN PATENT DOCUMENTS

JP 2008-171268 A 7/2008
JP 2010-089487 A 4/2010

* cited by examiner

*Primary Examiner* — Jamares Q Washington

(74) *Attorney, Agent, or Firm* — IP Business Solutions, LLC

(57) ABSTRACT

A control device acts as a reference color converter that converts inputted image data into reference image data of a color space, a prospective medium color converter that converts the inputted image data into output image data for reproducing the image with a plurality of color materials, and generates comparative output image data of the color space, by converting the color space of the output image data, a color difference calculator that compares colors between the reference image data and the comparative output image data, and calculates a specific color difference corresponding to a predetermined cumulative relative frequency, an image forming cost calculator that calculates the image forming cost, and a sheet selection supporter that extracts the prospective image forming medium that provides the specific color difference smaller than a predetermined threshold, and displays the prospective image forming medium in different appearances according to the image forming cost.

9 Claims, 15 Drawing Sheets

(58) Field of Classification Search
USPC .................................... 358/1.9, 504; 399/45
See application file for complete search history.

Fig.5

EXAMPLE OF IMAGE FORMING MEDIUM DATABASE

141

| MEDIUM ID | 0001 | 0002 | 0003 | | 0010 | 0011 | 0012 | |
|---|---|---|---|---|---|---|---|---|
| NAME | MEDIUM A | MEDIUM B | MEDIUM C | | MEDIUM M | MEDIUM N | MEDIUM O | |
| SHEET SIZE<br>GRAMMAGE<br>TYPE | A4<br>60<br>MATTE | A4<br>80<br>MATTE | A4<br>120<br>MATTE | | A4<br>82<br>MATTE | A4<br>80<br>GLOSSY | A4<br>115<br>GLOSSY | |
| PRICE/SHEET<br>YEN | 0.7 | 0.7 | 0.7 | ··· | 5.2 | 13.5 | 19 | ··· |
| MAXIMUM EJECTION AMOUNT C<br>M<br>Y<br>K | 6<br>6<br>6<br>6 | 7.5<br>7.5<br>7.5<br>9 | 12.5<br>12.5<br>12.5<br>15 | | 9<br>9<br>9<br>9 | 7.5<br>7.5<br>7.5<br>9 | 12.5<br>12.5<br>12.5<br>15 | |
| GAMUT SIZE | SMALL | MEDIUM | LARGE | | SMALL | MEDIUM | LARGE | |
| ICC PROFILE | PROFILE A | PROFILE B | PROFILE C | | PROFILE M | PROFILE N | PROFILE O | |

Fig.6A

EXAMPLE OF INK EJECTION AMOUNT DATABASE

142

| INK GRADATION VALUE (0–100%) | 0012 | | | | | | | | | |
|---|---|---|---|---|---|---|---|---|---|---|
| | C060 | C075 | C090 | ··· | M060 | M125 | M150 | ··· | Y060 | ··· |
| 0 | 0 | 0 | 0 | | 0 | 0 | 0 | | 0 | |
| 1 | 0.01 | 0.05 | 0.08 | | 0.013 | 0.09 | 0.012 | | 0.012 | |
| 2 | 0.02 | 0.052 | 0.087 | | 0.029 | 0.12 | 0.015 | | 0.025 | |
| 3 | | | | | | | | | | |
| · | | | | | | | | | | |
| · | | | | | | | | | | |
| · | | | | | | | | | | |
| 99 | 5.5 | 7.12 | 8.14 | | 5.12 | 12.11 | 14.89 | | 5.28 | |
| 100 | 6 | 7.5 | 9 | | 6 | 12.5 | 15 | | 6 | |

IMAGE FORMING CONTROL DEVICE THAT SELECTS IMAGE FORMING MEDIUM FOR REPRODUCING IMAGE COLOR INDICATED BY INPUTTED IMAGE DATA, IMAGE FORMING APPARATUS, IMAGE FORMING CONTROL METHOD, AND NON-TRANSITORY COMPUTER-READABLE RECORDING MEDIUM HAVING IMAGE FORMING CONTROL PROGRAM

INCORPORATION BY REFERENCE

This application claims priority to Japanese Patent Application No. 2019-053114 filed on Mar. 20, 2019, the entire contents of which are incorporated by reference herein.

BACKGROUND

The present disclosure relates to an image forming control device, an image forming apparatus, an image forming control method, and a non-transitory computer-readable recording medium having an image forming control program, and more particularly to a technique to select an image forming medium for reproducing an image color indicated by inputted image data.

Image forming apparatuses capable of performing color printing, in addition to monochrome printing, have come to be widely used. However, from a practical point of view the color printing requires a higher cost, which makes users hesitate from using the color printing. Accordingly, a technique to introduce a printing mode that reduces the consumption of color materials has been proposed, to perform the color printing at a lower cost. With such a technique, however, when the use of the color material is excessively reduced, the overall image becomes dim and blurred, and the vividness of the image that would otherwise be attained is impaired. Conversely, giving too much weight to the image quality leads to unsatisfactory outcome in reduction in consumption of the color material. To cope with such drawbacks, a first technique has been proposed, to reduce the cost of the color material, without compromising the hue balance. In addition, a second technique has been proposed, to select an image forming medium that can express a color closest to the image data, on the basis of an average value of the color difference.

SUMMARY

The disclosure proposes further improvement of the foregoing technique.

In an aspect, the disclosure provides an image forming control device that selects a specific image forming medium out of a plurality of image forming media, and controls an image forming device so as to form an image represented by inputted image data, on the specific image forming medium selected. The image forming control device includes a display and a control device. The control device includes a processor, and acts, when the processor executes an image forming control program, as a reference color converter, a prospective medium color converter, a color difference calculator, an image forming cost calculator, and a sheet selection supporter. The reference color converter converts the inputted image data into reference image data that serves as reference in a color space for color comparison. The prospective medium color converter generates an output profile and a simulation profile, on a basis of a medium profile representing a characteristic of each of the plurality of image forming media, converts the inputted image data, on a basis of the output profile, into output image data for reproducing the image represented by the inputted image data with a plurality of color materials, and generates, on a basis of the simulation profile, comparative output image data, being the image data based on the color space for color comparison, by converting the color space of the converted output image data. The color difference calculator compares colors between the reference image data and the comparative output image data, with respect to each pixel, and calculates a specific color difference corresponding to a cumulative relative frequency of a predetermined ratio, with respect to each of the plurality of image forming media. The image forming cost calculator calculates, on a basis of the output image data, a cost for forming an image using the image forming medium, with respect to each of the plurality of image forming media. The sheet selection supporter extracts one or more image forming media that provide the specific color difference smaller than a predetermined threshold, out of the plurality of image forming media, as a prospective image forming medium, and displays the one or more prospective image forming media extracted, differently according to the image forming cost, on the display.

In another aspect, the disclosure provides an image forming apparatus including the foregoing image forming control device, and an image forming device. The image forming device forms an image represented by the inputted image data, on the image forming medium.

In another aspect, the disclosure provides an image forming control method including selecting a specific image forming medium out of a plurality of image forming media, and controlling an image forming device so as to form an image represented by inputted image data, on the specific image forming medium selected. The image forming control method includes reference color conversion, prospective medium color conversion, color difference calculation, image forming cost calculation, and sheet selection support. The reference color conversion includes converting the inputted image data into reference image data that serves as reference in a color space for color comparison. The prospective medium color conversion includes generating an output profile and a simulation profile, on a basis of a medium profile representing a characteristic of each of the plurality of image forming media, converting the inputted image data, on a basis of the output profile, into output image data for reproducing the image represented by the inputted image data with a plurality of color materials, and generating, on a basis of the simulation profile, comparative output image data, being the image data based on the color space for color comparison, by converting the color space of the converted output image data. The color difference calculation includes comparing colors between the reference image data and the comparative output image data, with respect to each pixel, and calculating a specific color difference corresponding to a cumulative relative frequency of a predetermined ratio, with respect to each of the plurality of image forming media. The image forming cost calculation includes calculating, on a basis of the output image data, a cost for forming an image using the image forming medium, with respect to each of the plurality of image forming media. The sheet selection support includes extracting one or more image forming media that provide the specific color difference smaller than a predetermined threshold, out of the plurality of image forming media, as a prospective image forming medium, and displaying the one or more prospective image forming media extracted, differently according to the image forming cost, on a display.

In still another aspect, the disclosure provides a non-transitory, computer-readable recording medium having an image forming control program stored therein, the image forming control program being configured to control an image forming control device including a display, and configured to select a specific image forming medium out of a plurality of image forming media, and control an image forming device so as to form an image represented by inputted image data, on the specific image forming medium selected. The image forming control program causes the image forming control device to act as a reference color converter, a prospective medium color converter, a color difference calculator, an image forming cost calculator, and a sheet selection supporter. The reference color converter converts the inputted image data into reference image data that serves as reference in a color space for color comparison. The prospective medium color converter generates an output profile and a simulation profile, on a basis of a medium profile representing a characteristic of each of the plurality of image forming media, converts the inputted image data, on a basis of the output profile, into output image data for reproducing the image represented by the inputted image data with a plurality of color materials, and generates, on a basis of the simulation profile, comparative output image data, being the image data based on the color space for color comparison, by converting the color space of the converted output image data. The color difference calculator compares colors between the reference image data and the comparative output image data, with respect to each pixel, and calculates a specific color difference corresponding to a cumulative relative frequency of a predetermined ratio, with respect to each of the plurality of image forming media. The image forming cost calculator calculates, on a basis of the output image data, a cost for forming an image using the image forming medium, with respect to each of the plurality of image forming media. The sheet selection supporter extracts one or more image forming media that provide the specific color difference smaller than a predetermined threshold, out of the plurality of image forming media, as a prospective image forming medium, and displays the one or more prospective image forming media extracted, differently according to the image forming cost, on the display.

BRIEF DESCRIPTION OF THE DRAWINGS

FIG. 5 is a table showing an example of an image forming medium database according to the embodiment of the disclosure.

FIG. 6A and FIG. 6B are a table and a graph respectively, for explaining an ink ejection amount database according to the embodiment of the disclosure.

DETAILED DESCRIPTION

Hereafter, an embodiment of the disclosure will be described, with reference to the drawings.

Figure 1:
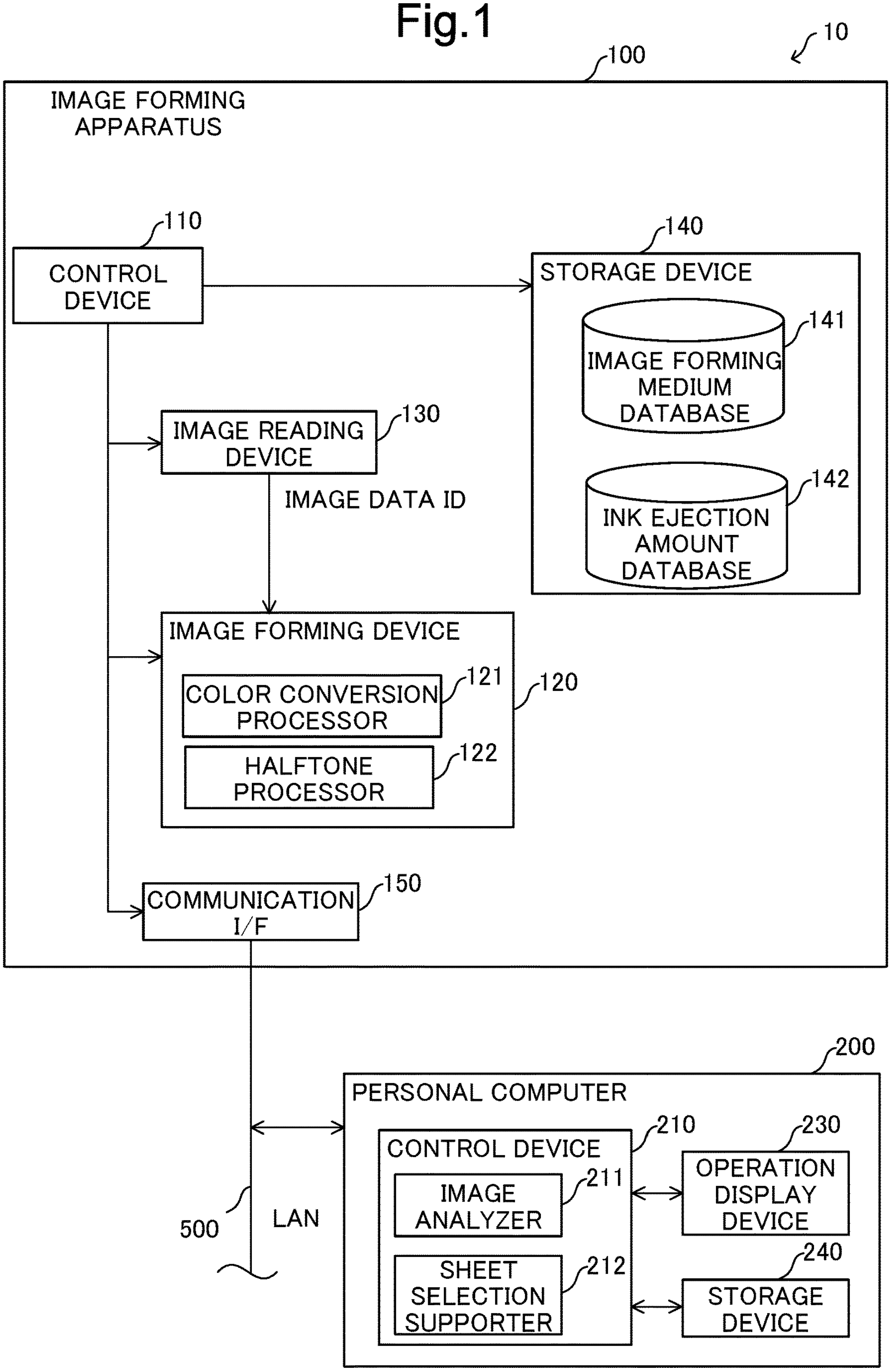
FIG. 1 is a schematic block diagram showing a general configuration of an image forming system according to an embodiment of the disclosure.

FIG. 1 is a schematic block diagram showing a general configuration of an image forming system 10 according to the embodiment of the disclosure. The image forming system 10 includes an image forming apparatus 100, a personal computer 200, and a local area network (often abbreviated as LAN) 500 connecting the image forming apparatus 100 and the personal computer 200.

The image forming apparatus 100 includes a control device 110, an image forming device 120, an image reading device 130, a storage device 140, and a communication interface (I/F) 150. The image forming device 120 includes a color conversion processor 121 and a halftone processor 122. The image reading device 130 reads an image from a source document thereby generating an image data ID which is RGB image data, and transmits the image data ID to the image forming device 120. The RGB image data is device-dependent image data (dependent on the image reading device 130).

The image reading device 130 possesses characteristics defined by an input profile. With the input profile, the image data ID, which is the device-dependent RGB image data, can be converted into Lab image data which is the image data of a Lab color space. Accordingly, the image forming apparatus 100 can convert the image data ID into, for example, sRGB image data via the Lab color space, and output the sRGB image data as scanned data.

The image forming device 120 possesses characteristics defined by an output profile. With the output profile, the Lab image data can be converted into CMYK image data based on the CMYK color space. The characteristics of the image forming device 120 can be simulated using a simulation profile. With the simulation profile, the CMYK image data can be converted into the Lab image data.

The image forming apparatus 100 possesses a device link profile which is a combination of the input profile and the output profile. With the device link profile, the burden of color conversion in a copying process can be alleviated, so that the printing speed can be improved.

Here, the process based on the output profile and the simulation profile is irreversible. In other words, when the Lab image data is converted into the CMYK image data with the output profile, and then such CMYK image data is converted into the Lab image data with the simulation profile, a color difference ΔE is produced between the Lab image data before and after the conversion, owing to the characteristics of the image forming device 120.

The color conversion processor 121 uses the device link profile, to generate the CMYK image data by converting the RGB image data, in the copying process. The CMYK image data is the device-dependent image data (dependent on the image forming device 120), for reproducing the image using the CMYK color material available to the image forming device 120. The image forming device 120 executes a Raster image processing on the CMYK image data using the halftone processor 122, to generate dot data which is bit map data. The dot data represents a status of dots formed by CMYK ink. Here, the color material is not limited to CMYK, but other plurality of color materials (e.g., CMYK LcLm, CMYK+Orange+Green) may be employed.

The image forming device 120 forms an image on a printing sheet according to the dot data, and discharges the printing sheet. In this embodiment, the image forming device 120 forms the image on the printing sheet according to a print job received from the personal computer 200. The dot data is the bit map data representing the dot formation status on the printing sheet. The printing sheet will also be referred to as image forming medium.

The personal computer 200 includes a control device 210, an operation display device 230, and a storage device 240. The control device 210 includes an image analyzer 211 and a sheet selection supporter 212. The operation display device 230 is a display possessing characteristics defined by a monitor profile, and having a touch panel. The operation display device 230 accepts inputs made by the user through buttons and switches (may be simply referred to as user input).

The control devices 110 and 210 each include a main storage device such as a random-access memory (RAM) and a read-only memory (ROM), and a control device such as a micro processing unit (MPU) or a central processing unit (CPU). The control devices 110 and 210 each possess controller functions related to interfaces such as input/output (I/O) ports, universal serial bus (USB) ports, bus, and other hardware, and controls the overall operation of the image forming apparatus 100 and the personal computer 200.

The storage devices 140 and 240 are each a storage device including a non-transitory recording medium such as a hard disk drive or a flash memory, storing therein an image forming control program to be executed by the control device 110 or 210, and various data. The storage device 140 contains an image forming medium database 141 and an ink ejection amount database 142. The storage device 240 contains an ICC profile (monitor profile) for the operation display device 230. In the image forming medium database 141, information about the printing sheets is registered. In the ink ejection amount database 142, relations between ink gradation values of CMYK ink and ink ejection amounts are registered. The information about the printing sheets includes control parameters of the respective printing sheets, and the ICC profile.

Figure 2:
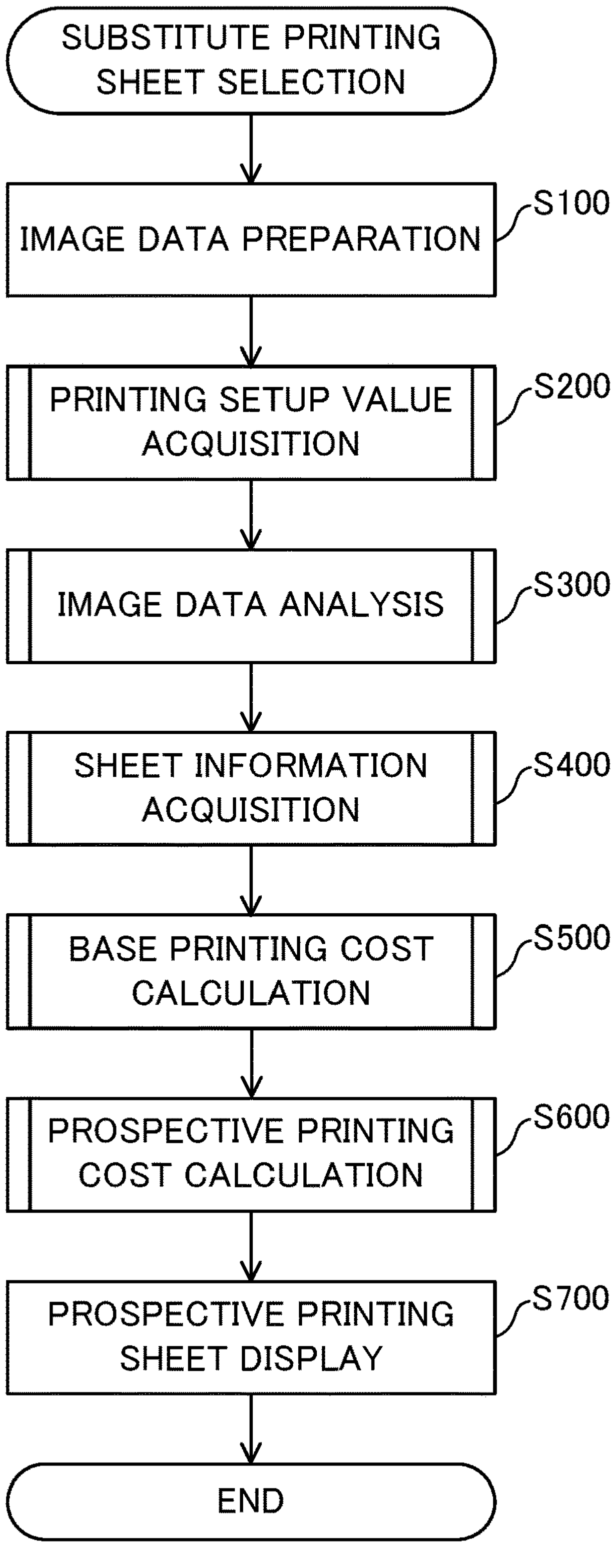
FIG. 2 is a flowchart showing a substitute printing sheet selection process according to the embodiment of the disclosure.

FIG. 2 is a flowchart showing a substitute printing sheet selection process. The substitute printing sheet selection includes selecting, as a prospective sheet, a printing sheet assumed to exhibit high color reproducibility, with minimal color difference, from an image printed on a reference printing sheet of a predetermined quality, and calculating a printing cost for printing the image on the selected printing sheet. Accordingly, the user can easily select the printing sheet that can be substituted for the reference printing sheet.

At step S100, the user prepares image data. To prepare the image data, the user selects in advance a color space for operation, for example from sRGB, Adobe (registered trademark) RGB, and CMYK (Japan Color 2001 Coated) on the personal computer 200 using graphic software, and generates a desired image to be printed. In this example, it is assumed that the user selects the sRGB color space. In this case, the personal computer 200 converts the sRGB image data, being the inputted image data representing the desired image to be printed, into the image data for display, using the monitor profile for the display of the operation display device 230, and displays the image data on the display.

At step S200, the control device 210 acquires a printing setup value. To acquire the printing setup value, the user operates the graphic software so as to display a printing setup screen on the display. The user selects either of color printing and monochrome printing, and determines the number of copies to be printed and the type of the printing sheet. The printing sheet thus selected may be referred to as reference printing sheet. In this example, the reference printing sheet will be referred to as medium A.

Figure 3A:
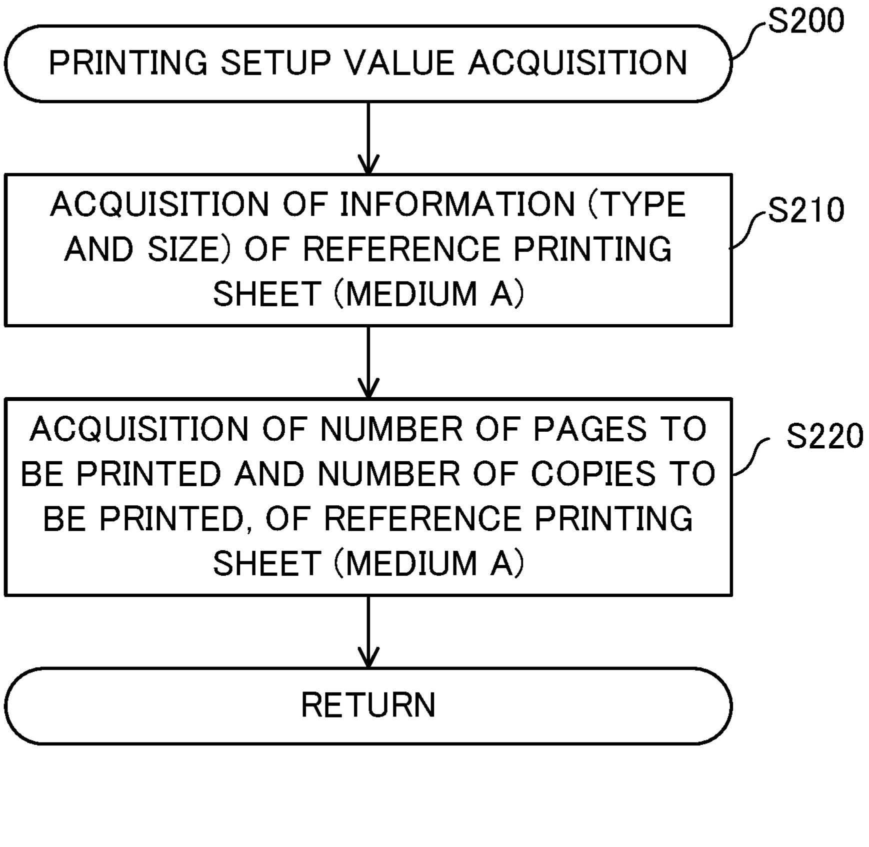
FIG. 3A is a flowchart showing a printing setup value acquisition process according to the embodiment of the disclosure.
Figure 3B:
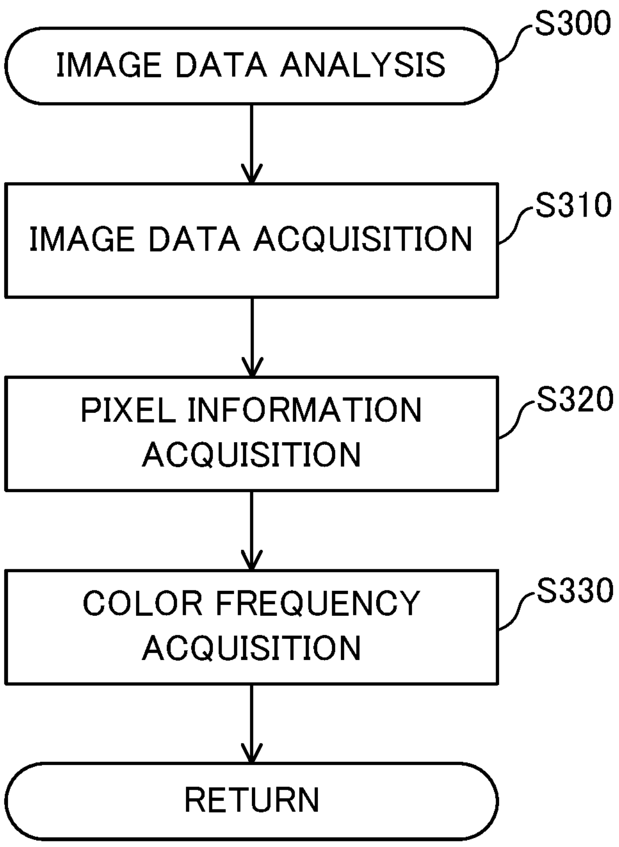
FIG. 3B is a flowchart showing an image data analysis process according to the embodiment of the disclosure.

FIG. 3A is a flowchart showing the detail of the printing setup value acquisition (step S200). FIG. 3B is a flowchart showing the detail of an image data analysis (step S300). At step S210, the control device 210 acquires medium information related to the printing sheet, out of the printing setup values. The medium information includes the type of the medium A (in this example, matte paper) selected as the reference printing sheet, and the size thereof (in this example, A4).

At step S220, the control device 210 acquires the number of pages to be printed and the number of copies, out of the printing setup values. The control device 210 can calculate the number of sheets to be printed, using (multiplying) the number of pages and the number of copies.

At step S300, the control device 210 analyzes the image data. At step S310, the control device 210 acquires the image data. To acquire the image data, the control device 210 controls the graphic software to acquire the sRGB image data. The sRGB image data is the image data based on a device-independent color space.

At step S320, the control device 210 acquires pixel information. To acquire the pixel information, the control device 210 acquires sRGB gradation values, which are the respective gradation values of R, G, and B of the sRGB image data. At step S330, the control device 210 acquires color frequency. In the color frequency acquisition, the control device 210 acquires the frequency of each color represented by the sRGB gradation value.

Figure 4:
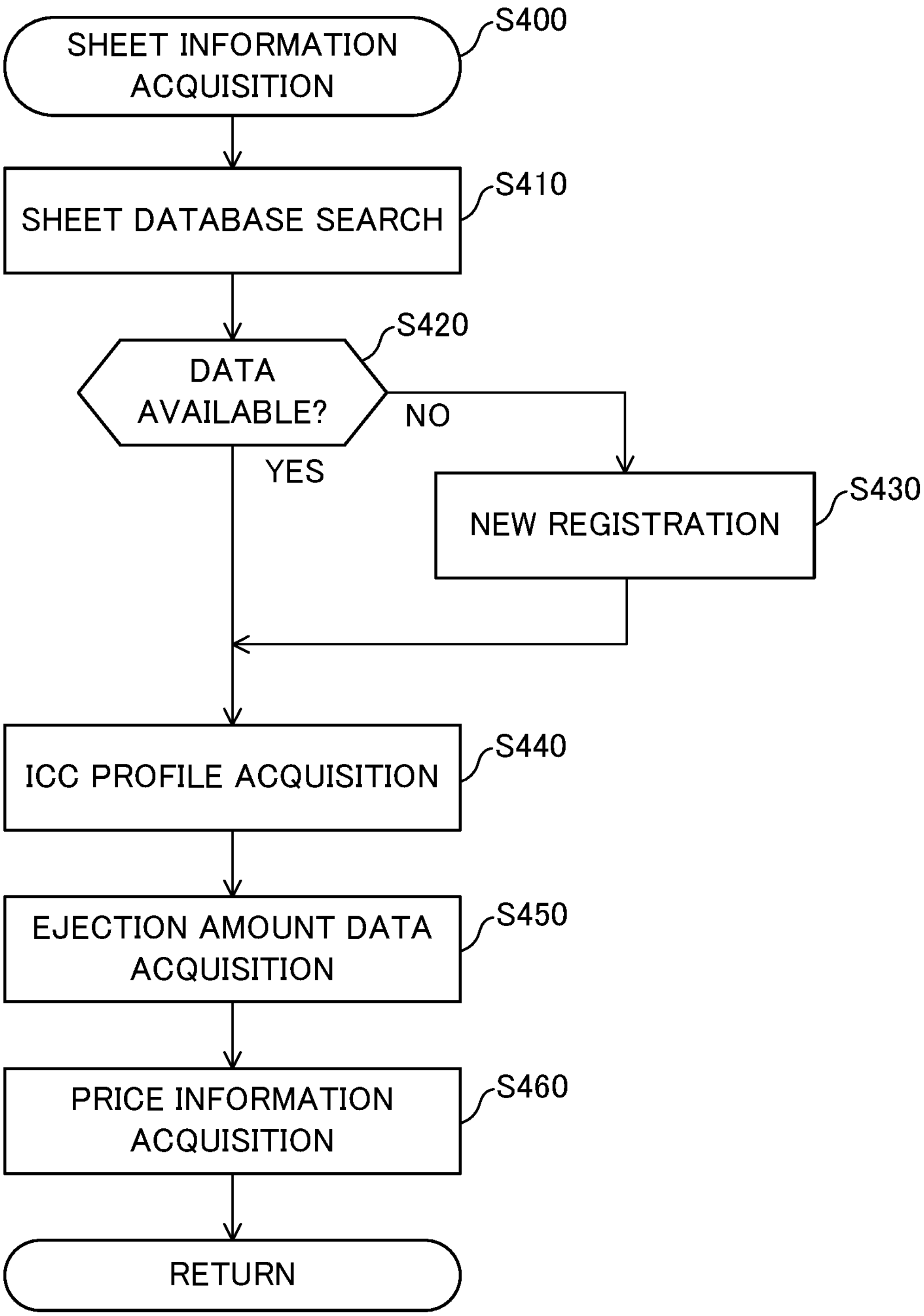
FIG. 4 is a flowchart showing a sheet information acquisition process according to the embodiment of the disclosure.

FIG. 4 is a flowchart showing the detail of sheet information acquisition (step S400). At step S410, the sheet selection supporter 212 searches a sheet database. In the sheet database search, the sheet selection supporter 212 searches the image forming medium database 141 for the type of the medium (in this example, medium A) acquired through the printing setup value acquisition.

FIG. 5 is a table showing an example of the image forming medium database 141. The image forming medium database 141 contains the record of each printing sheet. The image forming medium database 141 includes fields for medium ID, medium name, sheet size, grammage, type (e.g., matte paper or glossy paper), price, maximum ejection amount, gamut size, and ICC profile. The maximum ejection amount is the ejection amount corresponds to 100% of the ink gradation value, specified in a range of 0% to 100%.

Here, the data in hatched regions are, though undisclosed to the user, accessible for the purpose of the substitute printing sheet selection.

Figure 6B:
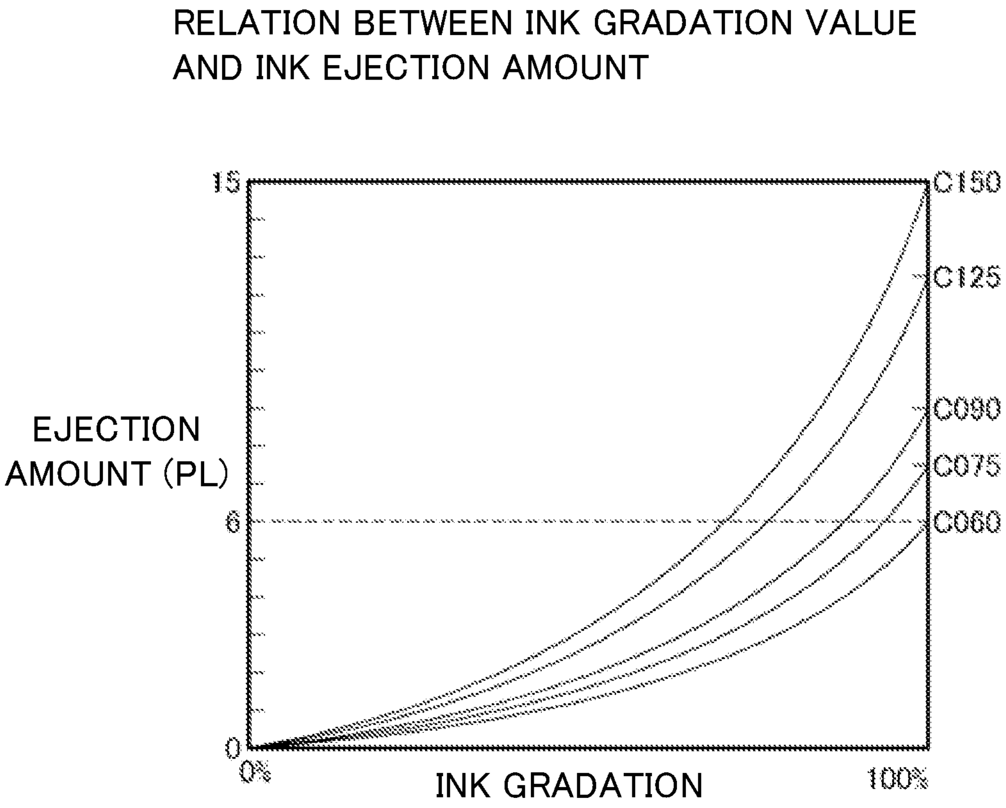

FIG. 6A and FIG. 6B each illustrate an example of the ink ejection amount database 142. The ink ejection amount database 142 shows the relation between the respective ink gradation values of C, M, Y, and K and the ink ejection amount. For example, C060 indicates the relation between the ink gradation value and the ink ejection amount, where the maximum ejection amount is 6 picoliter (PL). The ink ejection amount has a non-linear characteristic with respect to the ink gradation value (see FIG. 6B), and therefore the ink ejection amount database 142 is made up in the form of an ink ejection amount table (see FIG. 6A), indicating the respective ink ejection amounts with respect to the ink gradation values from 0% to 100%.

The sheet selection supporter 212 proceeds to step S440 when the object of the search (in this case, medium A) is registered in the image forming medium database 141 (YES at step S420), but proceeds to step S430 in the negative case. At step S430, the sheet selection supporter 212 activates a new registration process, and causes the operation display device 230 to display a screen urging the user to make a new registration.

At step S440, the sheet selection supporter 212 acquires the ICC profile of the medium A, from the image forming medium database 141. The ICC profile, also called a medium profile, is utilized to generate an output profile and a simulation profile, representing the characteristics of the image forming device 120 of the image forming apparatus 100.

At step S450, the sheet selection supporter 212 acquires the respective maximum ejection amounts of the CMYK inks, specified according to the image forming medium database 141 for the color reproduction on the medium A, and acquires the ink ejection amount table from the ink ejection amount database 142, on the basis of the maximum ejection amount acquired as above. More specifically, the sheet selection supporter 212 acquires the ink ejection amount table of C060 (see FIG. 6A), with respect to the cyan ink the maximum ejection amount of which is specified as 6 PL. At step S460, the sheet selection supporter 212 acquires the price information of the medium A, from the image forming medium database 141.

Figure 7:
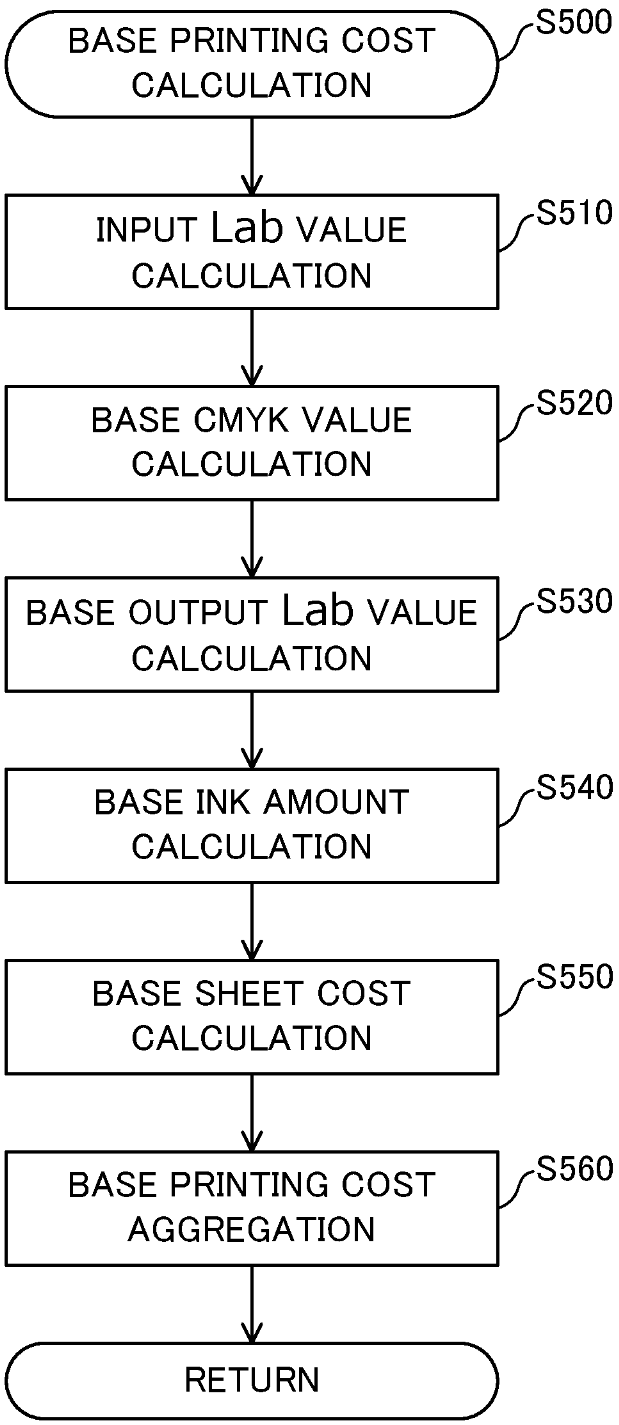
FIG. 7 is a flowchart showing a base printing cost calculation process according to the embodiment of the disclosure.

FIG. 7 is a flowchart showing the detail of base printing cost calculation (step S500). At step S500 (see FIG. 2), the sheet selection supporter 212 acts as an image forming cost calculator, to calculate a base printing cost. In the base printing cost calculation, the sheet selection supporter 212 calculates a base printing cost including the cost of the medium A and that of the ink, on the basis of the printing setup value (number of sheets to be printed) and the inputted image data.

At step S510, the image analyzer 211 calculates an input Lab value. In the input Lab value calculation, the image analyzer 211 converts the inputted image data, in other words the sRGB inputted image data (device-independent), with a known calculation formula, to thereby calculate the input Lab value for a color space for color comparison (in this case, Lab color space). The image analyzer 211 generates the Lab image data, on the basis of the input Lab value.

At step S520, the image analyzer 211 converts the inputted image data into output image data (also referred to as base CMYK image data) for reproducing the image represented by the inputted image data, on the medium A using a plurality of color materials (in this example, CMYK ink), on the basis of the output profile generated using the ICC profile of the medium A.

At step S530, the image analyzer 211 converts the color space of the base CMYK image data on the basis of the simulation profile, to thereby generate reference image data, in other words the image data based on the color space for color comparison (in this example, Lab color space). The reference image data contains a base output Lab value. The base output Lab value represents the gradation value (simulated value) of the image to be printed practically reproduced on the medium A, in the Lab color space. It is because the Lab color space is a device-independent color space (CIE L*a*b*color space), designed with emphasis on perceptive uniformity so as to approximate the human visual sensation, that the color difference $\Delta E$ (deviation) is calculated in the Lab color space.

At step S540, the sheet selection supporter 212 calculates a base ink amount. In the base ink amount calculation, the sheet selection supporter 212 calculates the total amount of the CMYK inks on the basis of the base CMYK image data, according to the ink ejection amount database 142.

At step S550, the sheet selection supporter 212 calculates a base sheet cost. In the base sheet cost calculation, the sheet selection supporter 212 multiplies the cost of the medium A by the number of sheets to be printed, thus to calculate the base sheet cost.

At step S560, the sheet selection supporter 212 aggregates the base printing cost. In the base printing cost aggregation, the sheet selection supporter 212 uses the result of the base ink amount calculation and the result of the base sheet cost calculation, to aggregate the base printing cost.

Figure 8:
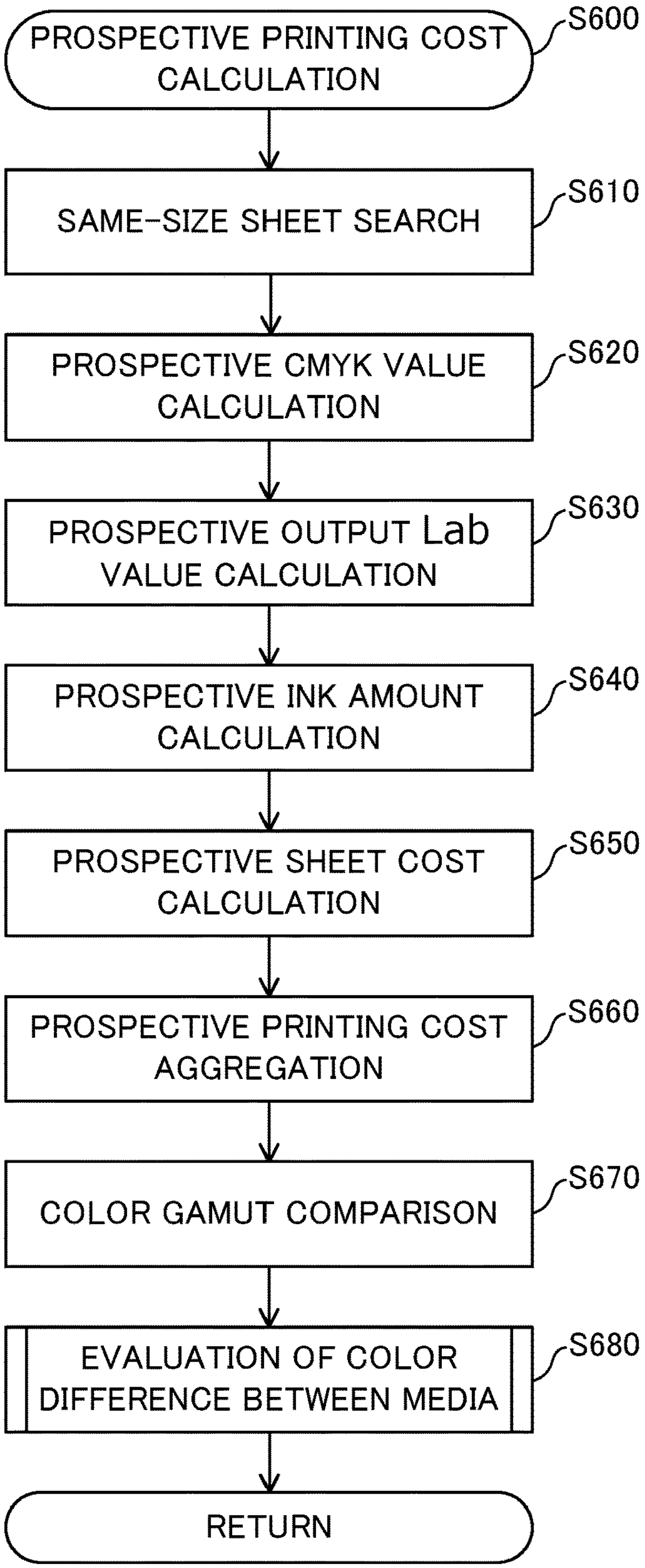
FIG. 8 is a flowchart showing a prospective printing cost calculation process according to the embodiment of the disclosure.

FIG. 8 is a flowchart showing the detail of prospective printing cost calculation (step S600). At step S600 (see FIG. 2), the sheet selection supporter 212 acts as an image forming cost calculator, to calculate a prospective printing cost. In the prospective printing cost calculation, the sheet selection supporter 212 calculates the printing cost required when the prospective printing sheet is employed as substitute for the medium A.

At step S610, the sheet selection supporter 212 searches for a same-size sheet. In the same-size sheet search, the sheet selection supporter 212 searches the image forming medium database 141, for a printing sheet of the size acquired through the printing setup value acquisition (in this example, A4). The sheet selection supporter 212 acquires the sheet information of the prospective printing sheets (see step S400 of FIG. 4).

At step S620, the image analyzer 211 calculates prospective CMYK values. In the prospective CMYK value calculation, the image analyzer 211 converts the inputted image data into output image data (also referred to as base CMYK image data) for reproducing the image represented by the inputted image data on the prospective printing sheet with a plurality of color materials (in this example, CMYK inks), on the basis of the output profile generated using the ICC profile of each prospective printing sheet.

At step S630, the image analyzer 211 calculates a prospective output Lab value. In the prospective output Lab value calculation, the image analyzer 211 converts the color space of the base CMYK image data on the basis of the simulation profile generated using the ICC profile of the prospective printing sheet, to thereby generate a comparative output image data, which is the image data based on the color space for color comparison (in this example, Lab color space). The comparative output image data contains the prospective output Lab value. The prospective output Lab value represents the gradation value (simulated value) of the image to be printed practically reproduced on the prospective printing sheet, in the Lab color space.

At step S640, the sheet selection supporter 212 calculates a prospective ink amount. In the prospective ink amount calculation, the sheet selection supporter 212 calculates the total amount of each of the CMYK inks using the ink ejection amount database 142, on the basis of the prospective CMYK image data.

At step S650, the sheet selection supporter 212 calculates a prospective sheet cost. In the prospective sheet cost calculation, the sheet selection supporter 212 multiplies the cost of each of the prospective printing sheets by the number of sheets to be printed, thus obtaining the cost of the prospective printing sheets.

At step S660, the sheet selection supporter 212 aggregates the prospective printing cost. In the prospective printing cost aggregation, the sheet selection supporter 212 uses the result of the prospective ink amount calculation and the result of the prospective sheet cost calculation, to aggregate the prospective printing cost.

At step S670, the image analyzer 211 compares color gamuts. In the color gamut comparison, the image analyzer 211 extracts the printing sheet, on which the color gamut of the image to be reproduced on the medium A (reference printing sheet) according to the inputted image data, can be reproduced, as the prospective printing sheet.

Figure 9:
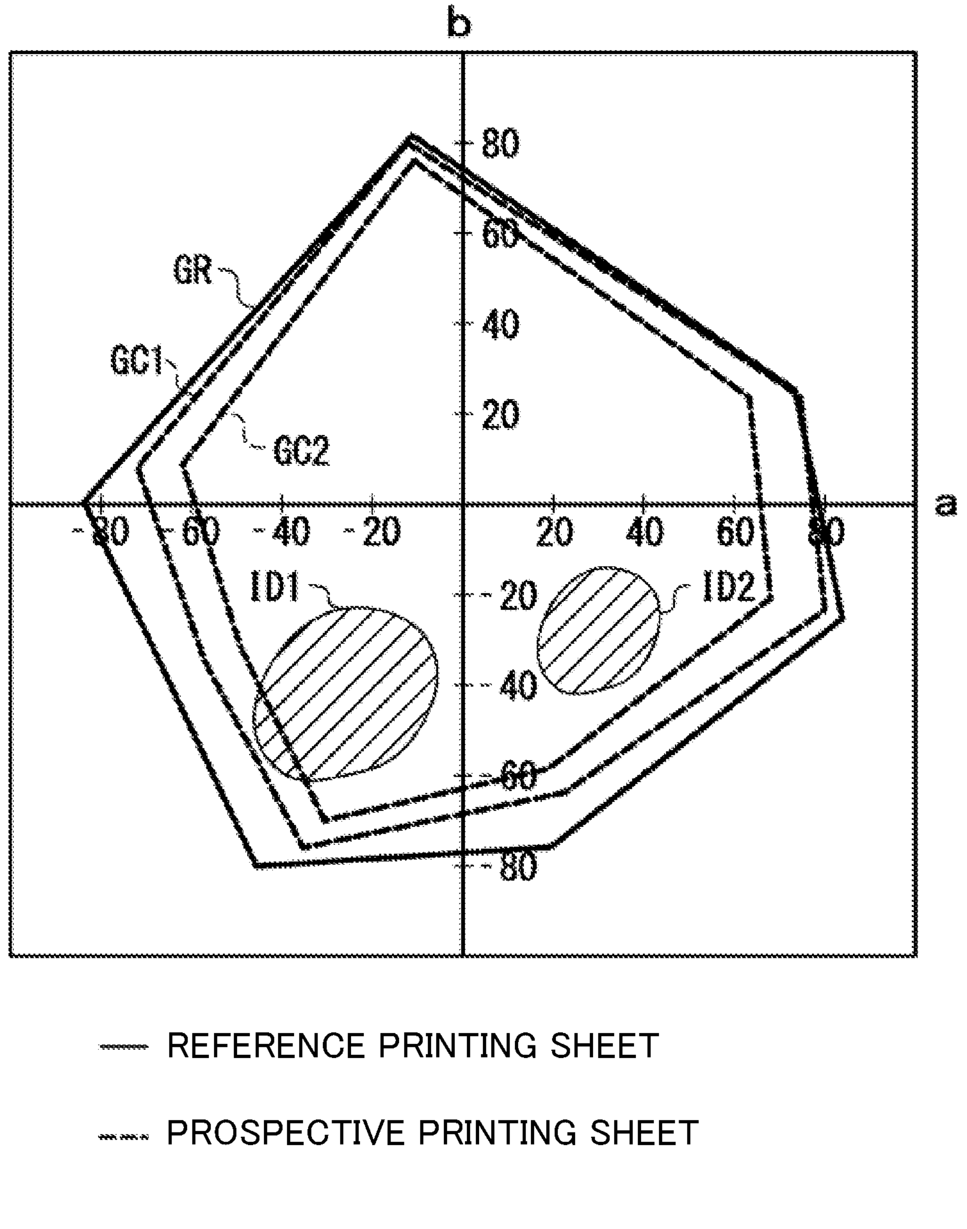
FIG. 9 is a diagram comparing the color gamuts of reproduced images on different printing sheets, according to the embodiment of the disclosure.

FIG. 9 is a diagram comparing the color gamuts of reproduced images on different printing sheets. A polygonal line GR indicates the color gamut of the image to be reproduced on the medium A (reference printing sheet). A polygonal line GC1 indicates the color gamut of the image to be reproduced on a first prospective printing sheet. A polygonal line GC2 indicates the color gamut of the image to be reproduced on a second prospective printing sheet. A color gamut ID1 indicates the color gamut to be reproduced according to first inputted image data. A color gamut ID2 indicates the color gamut to be reproduced according to second inputted image data. In this example, it is assumed that the color gamut ID1 and the color gamut ID2 are reproducible on the reference printing sheet.

When the color gamut of the image data representing the image to be printed is the color gamut of the first inputted image data (color gamut ID1), the color gamut of the first inputted image data is reproducible on the reference printing sheet. However, while the color gamut of the first inputted image data is reproducible on the first prospective printing sheet, this color gamut is non-reproducible on the second prospective printing sheet. Accordingly, the second prospective printing sheet is disqualified from the prospective printing sheets, with respect to the first inputted image data. The color gamut of the second inputted image data is reproducible on the reference printing sheet, and also reproducible on both of the first prospective printing sheet and the second prospective printing sheet. Accordingly, the both printing sheets are qualified as the prospective printing sheets.

Figure 10:
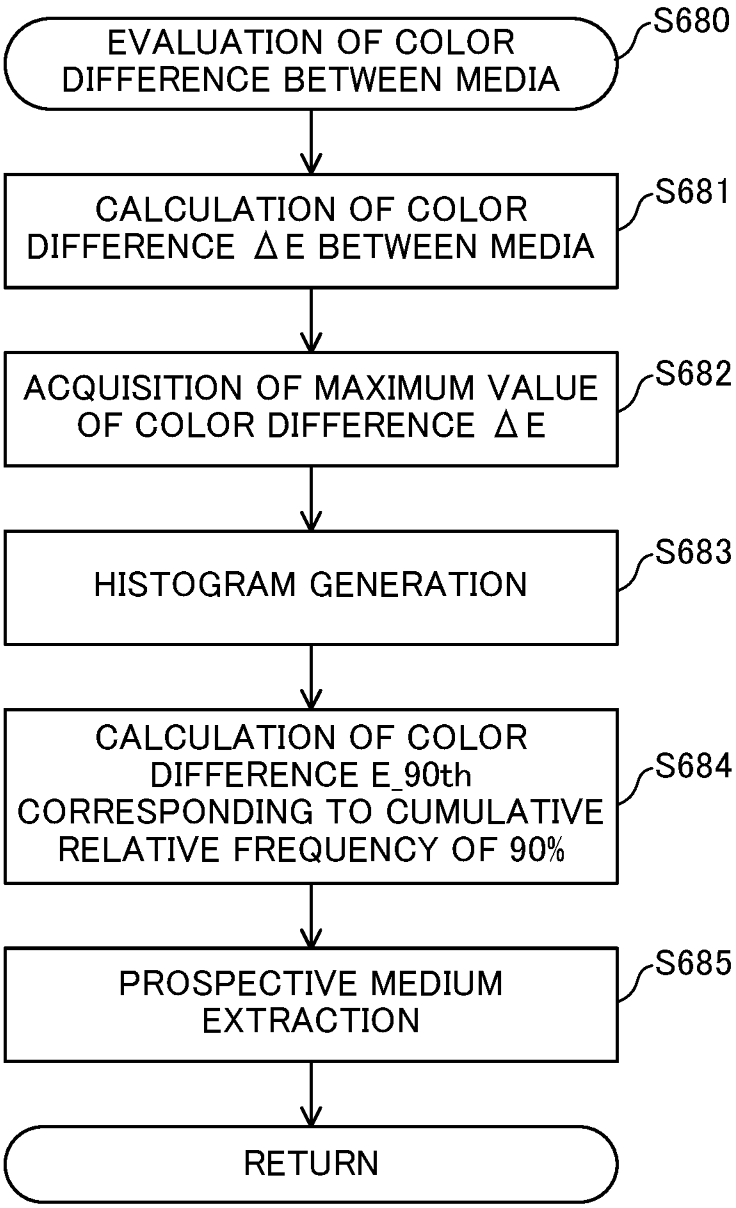
FIG. 10 is a flowchart showing an evaluation process of color difference between media, according to the embodiment of the disclosure.

FIG. 10 is a flowchart showing the detail of evaluation of color difference between media (step S680). At step S680, the image analyzer 211 evaluates the color difference between media. In the evaluation of color difference between media, the image analyzer 211 compares, for evaluation, between the color reproduced on the medium A (reference printing sheet) and the color reproduced on the prospective printing sheet, in the color space for color comparison (in this example, Lab color space), using the cumulative relative frequency.

At step S681, the image analyzer 211 calculates the color difference between media ΔE. In the calculation of the color difference between media ΔE, the image analyzer 211 acts as a color difference calculator, to calculate the color difference ΔE between the base output Lab value of the color reproduced on the medium A (reference printing sheet) and the prospective output Lab value of the color reproduced on the prospective printing sheet. The color difference ΔE stands for the difference between the base output Lab value and the prospective output Lab value, and is calculated with respect to each pixel.

At step S682, the image analyzer 211 acquires a maximum value ΔE_max of the color difference ΔE, with respect to each of the differences between the base output Lab value and the prospective output Lab value. At step S683, the image analyzer 211 generates a histogram of the color difference ΔE, over a color difference range from zero to the maximum value ΔE_max, with respect to each of the prospective printing sheets.

Figure 11A:
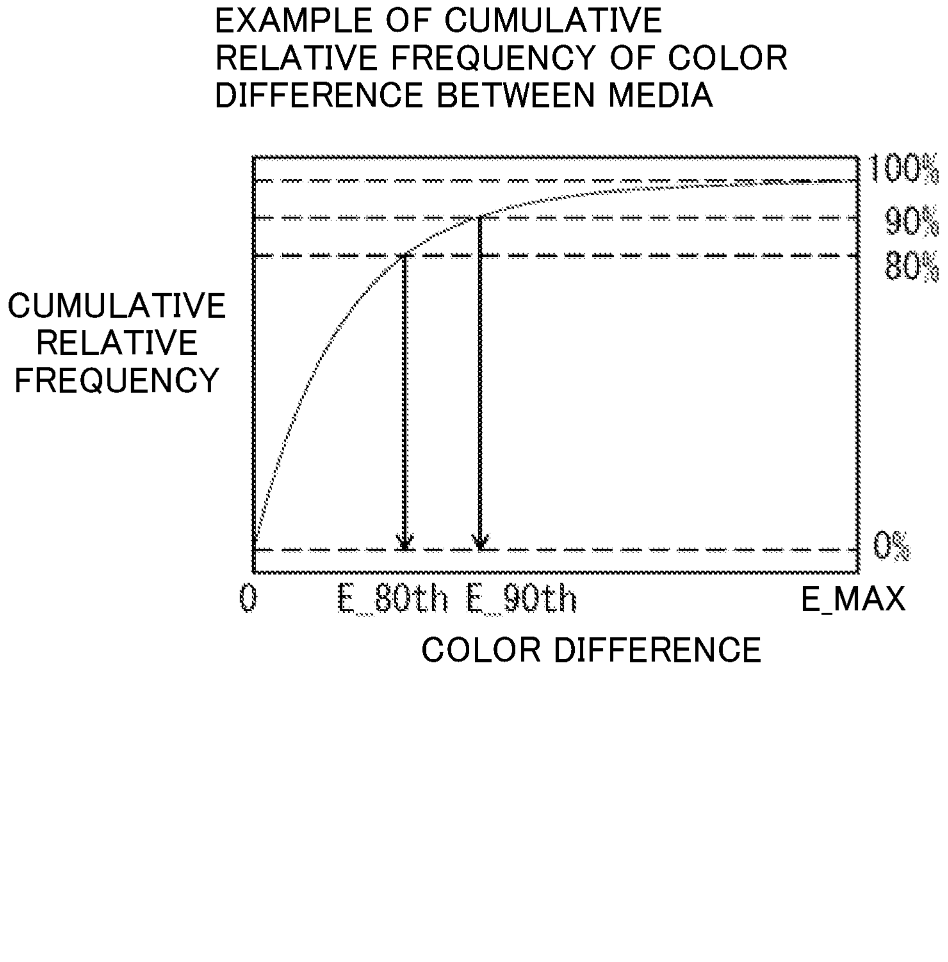
FIG. 11A and FIG. 11B are graphs for explaining a cumulative relative frequency of color difference ΔE between media, according to the embodiment of the disclosure.
Figure 11B:
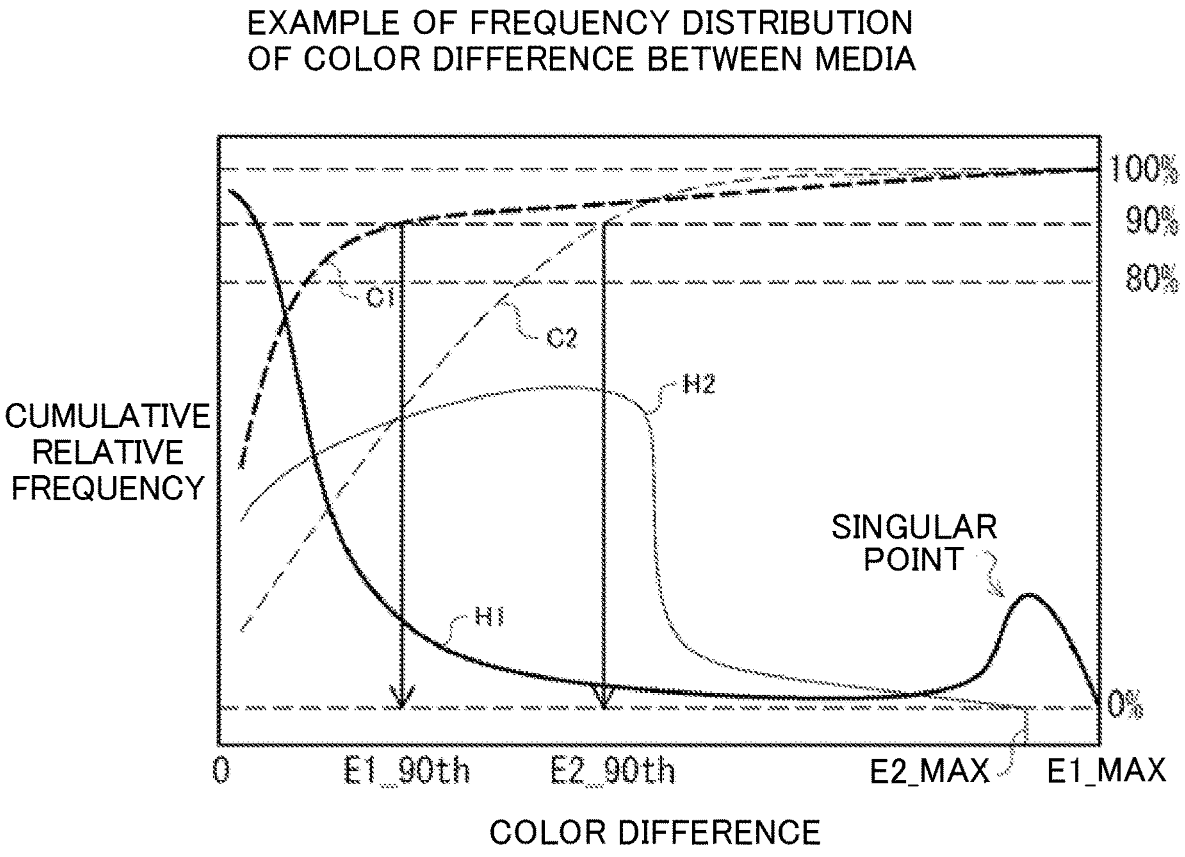

FIG. 11A and FIG. 11B are graphs for explaining the cumulative relative frequency of the color difference ΔE between media. FIG. 11A shows an example of the cumulative relative frequency of the color differences between media. The cumulative relative frequency is represented by a line graph indicating the cumulative number of pixels, obtained by accumulating the number of pixels in a sequence from the pixels of smallest color difference ΔE. The cumulative relative frequency is calculated with respect to each of the combinations of the reference medium and the prospective printing sheet. A color difference E_90th represents the color difference ΔE corresponding to the point where the cumulative relative frequency of the pixel reaches 90%, after the increase from zero.

Here, the cumulative relative frequency is not limited to 90%, but may be set to another predetermined ratio, or the user may set the ratio as desired. Specifically, for example, 95% may be adopted on the basis of a criterion that the colors should be generally the same, and in the case of a printing sheet for test printing, for checking not only the image layout but also the coloring, the color difference ΔE corresponding to the cumulative relative frequency of 80% may be adopted.

FIG. 11B shows a histogram of the cumulative relative frequency of the color differences ΔE between the reference printing sheet and two prospective printing sheets, and the color difference. The histogram of the color difference ΔE represents the frequency (the number of times) of the number of pixels at each of the color differences ΔE. The horizontal axis represents the range of the color difference ΔE, from zero to the maximum value ΔE_max. The vertical axis represents the range of the cumulative relative frequency of the color difference ΔE, from 0% to 100%. In this example, it is assumed that the image analyzer 211 has acquired the maximum value ΔE1_max of the color difference between the reference printing sheet and the first prospective printing sheet, and the maximum value ΔE2_max of the color difference between the reference printing sheet and the second prospective printing sheet.

A frequency curve H1 (bold solid line) represents the histogram of the color difference ΔE1 between the first prospective printing sheet and the reference printing sheet. A frequency curve H2 (fine solid line) represents the histogram of the color difference ΔE2 between the second prospective printing sheet and the reference printing sheet. A frequency curve C1 (bold dotted line) represents the cumulative relative frequency of the color difference ΔE1 between the first prospective printing sheet and the reference printing sheet. A frequency curve C2 (fine dotted line) represents the cumulative relative frequency of the color difference ΔE2 between the second prospective printing sheet and the reference printing sheet.

At step S684, the image analyzer 211 calculates the color difference E_90th (also referred to as specific color difference), corresponding to the cumulative relative frequency of 90% in the histogram of the color difference ΔE, with respect to each of the two prospective printing sheets. In this example, the image analyzer 211 calculates the color difference E1_90th between the first prospective printing sheet and the reference printing sheet, and the color difference E2_90th between the second prospective printing sheet and the reference printing sheet.

At step S685, the image analyzer 211 extracts a prospective medium. In the prospective medium extraction, the sheet selection supporter 212 compares between the color difference E_90th (in this example, color difference E1_90th and color difference E2_90th) and a predetermined threshold Th, and selects the printing sheet that provides the color difference E_90th smaller than the threshold Th, as the prospective printing sheet. In this example, it is assumed that the sheet selection supporter 212 has selected both of the first prospective printing sheet and the second prospective printing sheet.

The sRGB image data representing the image to be printed is generated by the user (e.g., designer or photographer). Normally, the user creates an image by arranging base colors occupying 50% or more of the overall image, assort colors occupying 20% to 40% of the overall image, and accent colors occupying less than 10% of the overall image. While accurate reproduction of the intended color is normally desired with respect to the base colors and the assort colors, reproduction of a highly contrastive color to the base colors and the assort colors is intended in the case of the accent colors, to make the image more vivid as a whole, or emphasize the base color. Therefore, reproducing, in particular, the base colors and the assort colors of the image to be printed with high accurately facilitates the image that fits the user's intention to be outputted.

Here, according to the foregoing second technique, an image forming medium that allows the color closest to the color represented by the image data to be expressed is selected, on the basis of an average value of the color differences. The present discloser has discovered, in contrast, that the technique based on the average value of the color differences may cause the image forming control device to output an evaluation deviated from the evaluation based on the human visual sensation, owing to an impact of what is known as a singular point. The singular point is, as shown in FIG. 11B, a specific frequency region of a larger color difference, isolated in the frequency distribution of the color difference. In this example, the average of the color differences of the first prospective printing sheet becomes greater than that of the second prospective printing sheet, owing to the impact of the singular point.

However, on the assumption that the base colors and the assort colors, occupying the majority of the image, can be accurately reproduced, by depending on the human visual sensation, the reproduced image that fits the intention of the user can be obtained. From such viewpoint, the evaluation of the printing sheet based on the cumulative relative frequency is more advantageous than the evaluation of the printing sheet based on the average value of the color differences. Further, normally the user does not necessarily wish to uniformly reproduce all the colors with high accuracy, but often uses colors that the user wishes to accurately reproduce because of being particular about that color (e.g., base color), and also colors in which the user is not so much interested. In other words, the requirement for the color reproducibility is not uniform.

In this example, although the first prospective printing sheet has a wider distribution in the histogram H1 of the color difference ΔE owing to the singular point, the color difference ΔE of 90%, in other words the majority of the pixels is distributed in a range close to zero. Therefore, the first prospective printing sheet is likely to provide more accurate reproducibility of the base colors and the assort colors, compared with the second prospective printing sheet.

At step S700 (see FIG. 2), the sheet selection supporter 212 displays the prospective printing sheets. When displaying the prospective printing sheets, the sheet selection supporter 212 displays a list of two prospective printing sheets, in descending order (from the highest one) of the printing cost reduction rate, from the reference printing sheet to the first prospective printing sheet, and to the second prospective printing sheet. Thus, the sheet selection supporter 212 differently displays the prospective printing sheets on the operation display device 230, according to the printing cost reduction rate, so that the order of the printing cost reduction rate is clearly shown.

The printing cost reduction rate of the first prospective printing sheet is obtained by subtracting the cost of printing on the first prospective printing sheet, from the reference printing cost for printing on the reference printing sheet, and dividing the difference by the reference printing cost. The printing cost reduction rate of the second prospective printing sheet is obtained by subtracting the cost of printing on the second prospective printing sheet, from the reference printing cost for printing on the reference printing sheet, and dividing the difference by the reference printing cost. The printing cost is also called image forming cost.

Here, a plurality of the specific color differences, instead of a single one, may be used in the prospective medium extraction (step S685). More specifically, the image analyzer 211 may use not only the color difference E_90th, but also the color difference E_80th. In this case, the image analyzer 211 extracts a first prospective printing sheet group, the color difference E_90th of which is smaller than the threshold Th, and a second prospective printing sheet group the color difference E_80th of which is smaller than the threshold Th, but the color difference E_90th of which is larger than the threshold Th. Then the sheet selection supporter 212 may display the first prospective printing sheet group listed in descending order of the printing cost reduction rate, and also display the second prospective printing sheet group, listed separately from the first prospective printing sheet group, in descending order of the printing cost reduction rate.

Further, the control device 210 may also act as a monitor color converter, to convert the comparative output image data, using a monitor profile, into display image data to be displayed on the operation display device 230, and display the image represented by the inputted image data in the colors that are reproducible on the prospective printing sheet, on the operation display device 230. This is because the color space for the monitor is normally broader than the color space for printing. In this process, the operation display device 230 can also display an image for identifying the image region reproduced in a color having the maximum color difference (e.g., symbol or mark).

In addition, the control device 210 may cause the operation display device 230 to display the cumulative relative frequency of the prospective printing sheets and the histogram of the color difference (see FIG. 11B), as reference information for the user for selecting the printing sheet. Further, the operation display device 230 may accept an input of the user specifying a part of the color difference range of the histogram, and display an image for identifying the image region reproduced in the color of the part of the color difference range specified by the user.

For example, when the image region reproduced in the color of a singular point is included in a part of the region, the control device 210 can indicate the image region reproduced in the color of the singular point, with a line surrounding that region, a symbol such as an arrow, or a mark. Accordingly, the user can confirm whether the color of the singular point is used in the image region where a heavy weight is given to the color reproducibility.

The present discloser has accomplished the image forming system 10 according to the foregoing embodiment, in view of the situation that, in the field of commercial printing, various types of printing sheets that are different from each other in characteristics and cost are prepared for what are known as production printers, and that therefore it is a heavy burden on the users to select the appropriate image forming medium, in consideration of the quality and cost of the color reproduction. The image forming system 10 according to this embodiment is configured, with a focus on the frequency distribution of the color difference, so as to suppress the impact of the singular point in the frequency distribution, and facilitate the prospective printing sheet that provides color reproducibility close to that of the reference printing sheet, to be selected as the substitute printing sheet, according to the evaluation criteria similar to the user's visual sensation. Therefore, the image forming system 10 according to this embodiment provides a user-friendly user interface designed in favor of the users, to support the appropriate selection of the printing sheet. Thus, a technique can be provided that alleviates the burden on the users to select the appropriate image forming medium, in consideration of the quality and cost of the color reproduction.

The disclosure may be implemented not only according to the foregoing embodiment, but also according to the following variations.

Variation 1

Although the color difference is calculated in the Lab color space in the foregoing embodiment, the color space for calculating the color difference is not limited to the Lab color space. It suffices that the color space for calculating the color difference is a color space for color comparison, which is a common color space for comparing the colors. However, the Lab color space is a device-independent color space (CIE L*a*b*color space), designed to approximate the human visual sensation with emphasis on the perceptive uniformity, which provides the advantage in that the evaluation close to the human visual sensitivity can be attained.

Variation 2

In the foregoing embodiment, the prospective printing sheet is evaluated by relative evaluation using the color difference between the prospective printing sheet and the reference printing sheet. However, the use of the reference printing sheet is not mandatory. More specifically, for example, the prospective printing sheet may be evaluated by relative comparison between a plurality of prospective printing sheets, using the inputted image data as reference. The prospective printing sheet is also called a prospective image forming medium.

Figure 12:
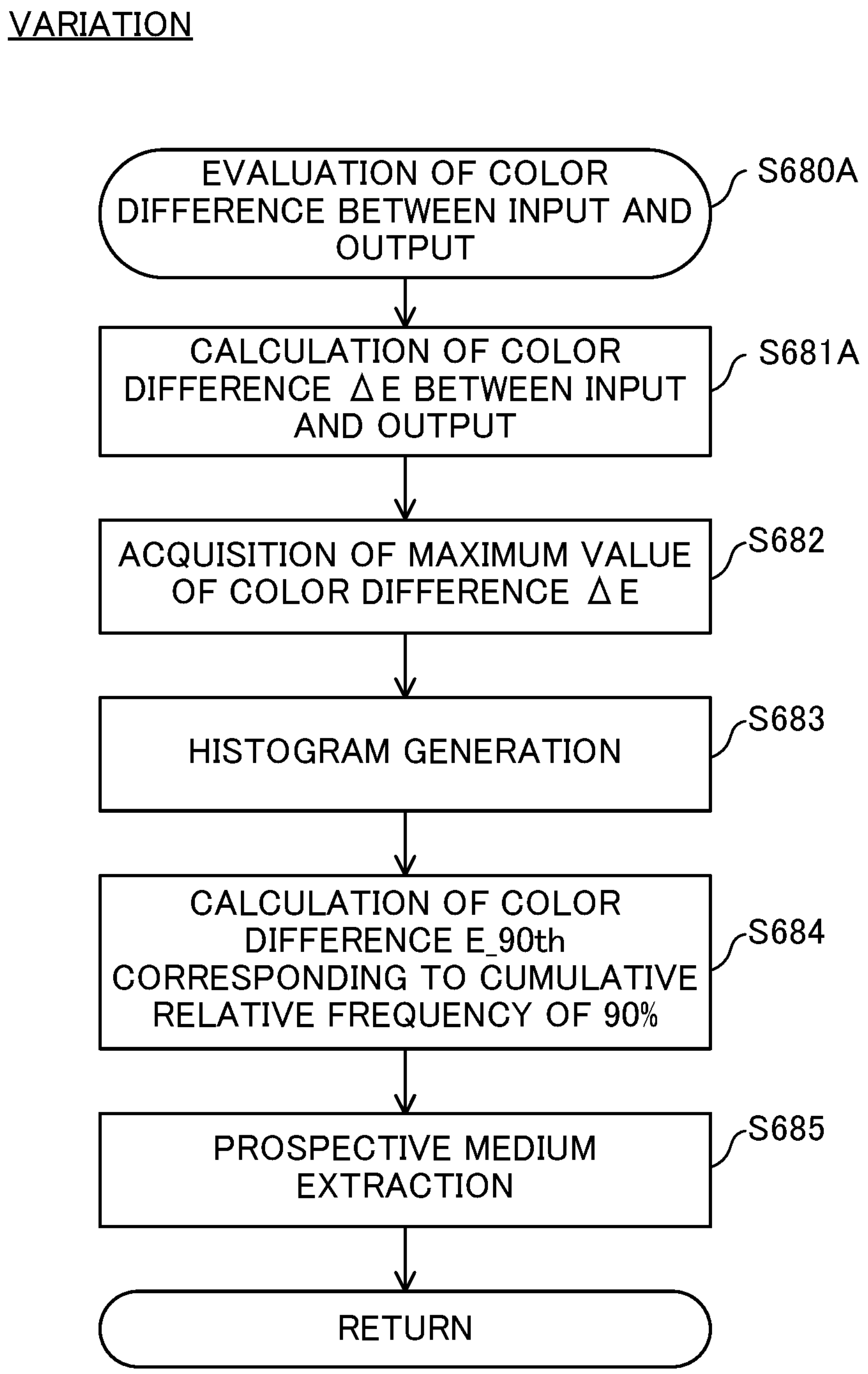
FIG. 12 is a flowchart showing an evaluation process of color difference between input and output, according to a variation of the disclosure.

FIG. 12 is a flowchart showing an evaluation process of the color difference between input and output (step S680A), according to a variation. The evaluation of color difference between input and output (step S680A) is different from the foregoing embodiment in that the calculation of the color difference ΔE between media (step S681) is substituted with the calculation of the color difference ΔE between input and output (step S681A), but the same in the remaining aspects. The color difference ΔE between input and output stands for the color difference between the inputted image data in the color space for color comparison (also called reference image data) and the image data reproduced on the prospective printing sheets.

In the evaluation of the color difference between input and output (step S680A), the image analyzer 211 acts as the reference color converter, and uses the reference image data without simulating the printing sheet, and therefore this evaluation is advantageous in the case of selecting the printing sheet from the scratch. In contrast, in the evaluation of the color difference between media (step S680), the image analyzer 211 acts as the prospective medium color converter, and uses the reference image data by simulating the reference printing sheet designated in advance as reference. Therefore, this evaluation is advantageous in the case of selecting a substitute printing sheet, for example for the purpose of test printing, cost reduction, or image quality improvement.

Variation 3

In the foregoing embodiment, the personal computer is utilized as the image forming control device, to cause the image forming apparatus to form the image on the basis of the inputted image data. However, the image forming apparatus may be configured so as to act as the image forming control device.

Variation 4

Although feedback of colorimetry of the image forming status of a plurality of image forming apparatuses is not performed in the foregoing embodiment, such colorimetry may be performed and fed back. The feedback result may be, for example, centrally managed by a server, and the image forming system may be configured so as to generate the output profile and the simulation profile of each image forming apparatus. With such a configuration, the image forming system 10 can suppress the impact of time degradation of the image forming apparatus 100, and perform the printing with high reproducibility, using the printing sheet about which the medium profile is not prepared.

While the present disclosure has been described in detail with reference to the embodiments thereof, it would be apparent to those skilled in the art the various changes and modifications may be made therein within the scope defined by the appended claims.

What is claimed is:

1. An image forming control device that selects a specific image forming medium out of a plurality of image forming media, and controls an image forming device so as to form an image represented by inputted image data on the specific image forming medium selected, the image forming control device comprising:

a display; and a control device including a processor, and configured to act, when the processor executes an image forming control program, as:

a reference color converter that converts the inputted image data into reference image data that serves as reference in a color space for color comparison;

a prospective medium color converter that generates an output profile and a simulation profile, on a basis of a medium profile representing a characteristic of each of the plurality of image forming media, converts the inputted image data, on a basis of the output profile, into output image data for reproducing the image represented by the inputted image data with a plurality of color materials, and generates, on a basis of the simulation profile, comparative output image data, being the image data based on the color space for color comparison, by converting the color space of the converted output image data;

a color difference calculator that compares colors between the reference image data and the comparative output image data, with respect to each pixel, and calculates a specific color difference corresponding to a cumulative relative frequency of a predetermined ratio, with respect to each of the plurality of image forming media;

an image forming cost calculator that calculates, on a basis of the output image data, a cost for forming an image using the image forming medium, with respect to each of the plurality of image forming media; and a sheet selection supporter that extracts one or more image forming media that provide the specific color difference smaller than a predetermined threshold, out of the plurality of image forming media, as a prospective image forming medium, and displays the one or more prospective image forming media extracted, differently according to the image forming cost, on the display.

2. The image forming control device according to claim 1, wherein the reference color converter generates the output profile and the simulation profile using the medium profile representing the characteristic of the image forming medium that serves as reference, converts the inputted image data, using the output profile, into output image data for reproducing the image represented by the inputted image data with a plurality of color materials, and generates, on a basis of the simulation profile, the reference image data by converting the color space of the converted output image data, and the sheet selection supporter displays the one or more prospective image forming media extracted, differently according to an image forming cost reduction rate, on the display.

3. The image forming control device according to claim 1, wherein the display possesses a characteristic defined by a monitor profile, the control device further acts as a monitor color converter, to convert the comparative output image data, using the monitor profile, into display image data to be displayed on the display, and the monitor color converter displays, on the display, the image represented by the inputted image data, in a color that can be reproduced on the specific image forming medium.

4. The image forming control device according to claim 3, wherein the color difference calculator calculates a maximum color difference being a maximum value of the respective specific color differences of the plurality of image forming media, and the monitor color converter displays an image for identifying an image region reproduced in a color having the maximum color difference, on the display.

5. The image forming control device according to claim 4, wherein the color difference calculator generates a histogram over a range of the color difference from zero to the maximum value, and the monitor color converter displays the histogram on the display, and displays, upon receipt of an input of a user specifying a part of the color difference range in the histogram, an image for identifying an image region reproduced in a color in the part of the color difference range specified by the user, on the display.

6. The image forming control device according to claim 1, wherein the color difference calculator calculates a first specific color difference of a point where the cumulative relative frequency of the color difference reaches a predetermined first ratio, and a second specific color difference of a point where the cumulative relative frequency of the color difference reaches a predetermined second ratio lower than the first ratio, with respect to each of the image forming media, and the sheet selection supporter extracts a first image forming media group, the first specific color difference of which is smaller than the predetermined threshold, and a second image forming media group, the first specific color difference of which is equal to or larger than the predetermined threshold, but the second specific color difference of which is smaller than the predetermined threshold, out of the plurality of image forming media, and displays the first image forming media group and the second image forming media group extracted, separately from each other, and differently according to the image forming cost, on the display.

7. An image forming apparatus comprising:

the image forming control device according to claim 1; and an image forming device that forms an image represented by the inputted image data, on the image forming medium.

8. An image forming control method including selecting a specific image forming medium out of a plurality of image forming media, and controlling an image forming device so as to form an image represented by inputted image data, on the specific image forming medium selected, the method comprising:

reference color conversion, including converting the inputted image data into reference image data that serves as reference in a color space for color comparison;

prospective medium color conversion, including generating an output profile and a simulation profile, on a basis of a medium profile representing a characteristic of each of the plurality of image forming media, converting the inputted image data, on a basis of the output profile, into output image data for reproducing the image represented by the inputted image data with a plurality of color materials, and generating, on a basis of the simulation profile, comparative output image data, being the image data based on the color space for color comparison, by converting the color space of the converted output image data;

color difference calculation, including comparing colors between the reference image data and the comparative output image data, with respect to each pixel, and calculating a specific color difference corresponding to a cumulative relative frequency of a predetermined ratio, with respect to each of the plurality of image forming media;

image forming cost calculation, including calculating, on a basis of the output image data, a cost for forming an image using the image forming medium, with respect to each of the plurality of image forming media; and sheet selection support, including extracting one or more image forming media that provide the specific color difference smaller than a predetermined threshold, out of the plurality of image forming media, as a prospective image forming medium, and displaying the one or more prospective image forming media extracted, differently according to the image forming cost, on a display.

9. A non-transitory, computer-readable recording medium having an image forming control program stored therein, the image forming control program being configured to control an image forming control device that includes a display, and configured to select a specific image forming medium out of a plurality of image forming media, and control an image forming device so as to form an image represented by inputted image data, on the specific image forming medium selected, by causing the image forming control device to act as:

a reference color converter that converts the inputted image data into reference image data that serves as reference in a color space for color comparison;

a prospective medium color converter that generates an output profile and a simulation profile, on a basis of a medium profile representing a characteristic of each of the plurality of image forming media, converts the inputted image data, on a basis of the output profile, into output image data for reproducing the image represented by the inputted image data with a plurality of color materials, and generates, on a basis of the simulation profile, comparative output image data, being the image data based on the color space for color comparison, by converting the color space of the converted output image data;

a color difference calculator that compares colors between the reference image data and the comparative output image data, with respect to each pixel, and calculates a specific color difference corresponding to a cumulative relative frequency of a predetermined ratio, with respect to each of the plurality of image forming media;

an image forming cost calculator that calculates, on a basis of the output image data, a cost for forming an image using the image forming medium, with respect to each of the plurality of image forming media; and a sheet selection supporter that extracts one or more image forming media that provide the specific color difference smaller than a predetermined threshold, out of the plurality of image forming media, as a prospective image forming medium, and displays the one or more prospective image forming media extracted, differently according to the image forming cost, on the display.

* * * * *